Aug. 11, 1925.  
A. NORIEGA  
RESILIENT TIRE  
Filed April 28, 1924    2 Sheets-Sheet 1

1,549,560

Inventor  
Alberto Noriega.  
By Victor J. Evans  
Attorney

Aug. 11, 1925.  
A. NORIEGA  
RESILIENT TIRE  
Filed April 28, 1924
Fig. 6.
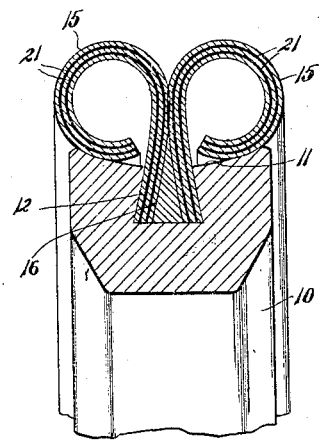
Fig. 7.
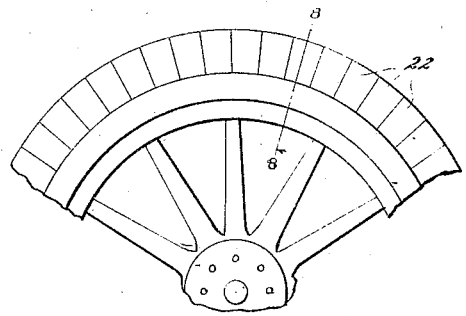
Fig. 8.
Fig. 9.
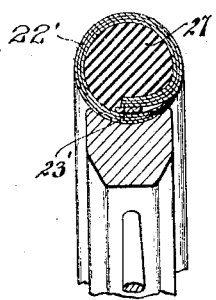
Fig. 10.
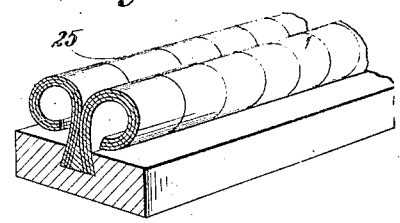
Inventor  
Alberto Noriega.

Patented Aug. 11, 1925.

1,549,560

UNITED STATES PATENT OFFICE.

ALBERTO NORIEGA, OF LIMA, PERU.

RESILIENT TIRE.

Application filed April 28, 1924. Serial No. 709,585.

*To all whom it may concern:*

Be it known that I, ALBERTO NORIEGA, a citizen of Peru, residing at Lima, Peru, have invented new and useful Improvements in Resilient Tires, of which the following is a specification.

This invention relates to improvements in resilient tires and has for an object the provision of a tire of novel construction which will include a maximum amount of resiliency without the disadvantages of the usual pneumatic tire, inasmuch as it is not subject to puncture or blow-out and will wear for a relatively long time.

Another object of the invention is the provision of a tire which may be quickly and easily secured to the rim of a wheel and which is so constructed that any damaged portion of the tire may be renewed without replacing the entire tire.

With the above and other objects in view, the invention further includes the following novel features and details of construction, to be hereinafter more fully described, illustrated in the accompanying drawings and pointed out in the appended claims.

In the drawings:—

Figure 6 is an enlarged fragmentary transverse section showing a modified form of tire.

Figure 7 is a fragmentary elevation of a still further modified form of tire.

Figure 8 is a transverse section taken on the line 8—8 of Figure 7.

Figure 9 is a transverse section of a further modified form.

Figure 10 is a fragmentary perspective view showing a different use of the invention.

Figure 4:
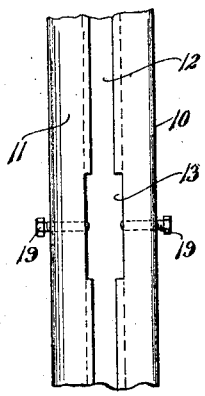
Figure 4 is a fragmentary edge view of the wheel rim.
Figure 5:
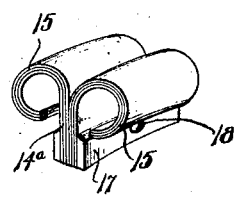
Figure 5 is a detail perspective view of the key section of the tire.

Referring to the drawings in detail wherein like characters of reference denote corresponding parts, the reference character 10 designates a wheel having a transversely curved seat 11 extending around its periphery and a circumferential channel 12 which extends inwardly from the seat 11. The opposite walls of the channel 12 are relatively inclined for the major portion of their length so as to provide a restricted opening for the channel, while the portions of the walls indicated at 13 are parallel so that the channel opening or mouth is widest at this point. This is clearly shown in Figure 4 of the drawings.

Figure 3:
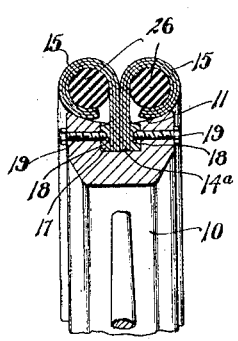
Figure 3 is a section on the line 3—3 of Figure 1.

The tire comprises a plurality of separate sections 14, each of which is preferably formed of a plurality of laminated resilient metal plates. These plates are transversely curved so as to provide oppositely extending portions 15 substantially circular in cross section which are received within the seat 11 and inwardly extending anchoring ends 16 whose opposite walls are inclined to engage the inclined walls of the channel 12. One of the tire sections which is indicated at 14$^a$ is the key section and is adapted to be received within the wide portion of the channel 12 as defined by the parallel walls 13. The sections 14 are first inserted within the wide portion of the channel and are moved circumferentially around the said channel until all of the sections are inserted except the key section 14$^a$. This last mentioned section is then inserted within the wide portion of the channel, the anchoring end 17 of the key section being shaped to fit the wide portion of the channel and being provided with sockets 18 in its opposite faces. These sockets are adapted to be engaged by screws or pins 19 which extend inwardly from the opposite side edges of the rim as shown in Figure 3 of the drawings.

The rim may be provided at intervals with passages 20 for the introduction of suitable lubricant, whereby the surfaces of the seats 11 may be properly lubricated to insure proper action of the free ends of the tire sections. If desired, leather or other linings 21 may be interposed between the metal plates of which the tire sections are formed.

Instead of forming the sections in the manner described, each section may be arranged in the form of a single cylinder with the ends overlapping as shown in Figures 8 and 9 of the drawings and indicated in said figures at 22 and 22' respectively. In Figure 8, the rim of the wheel is shaped as previously described and one end of each section carries a lug 23 which is received within the channel 12.

In Figure 9 the tire section 22' is held in place by means of a band 23' which extends circumferentially of the wheel.

In addition to its use as a tire, the invention further provides a flexible attachment which may be used in connection with slabs or plates as shown at 25 in Figure 10 of the drawings. This provides means whereby plane surfaces are rendered elastic or resilient and provides means for checking or cushioning blows.

Figure 1:
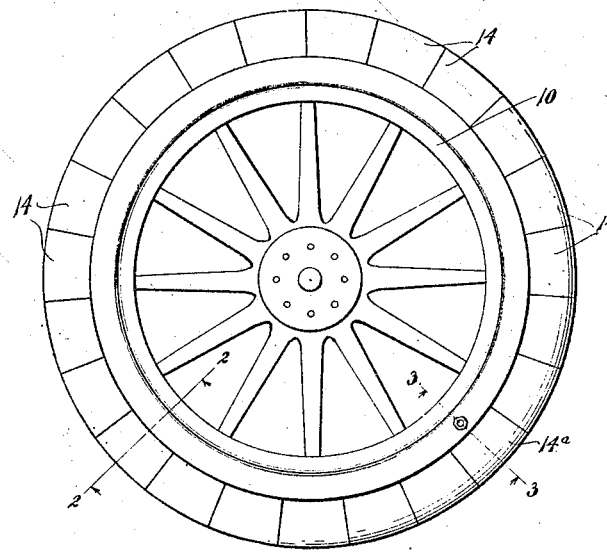
Figure 1 is an elevation of a wheel having a tire attached thereto.
Figure 2:
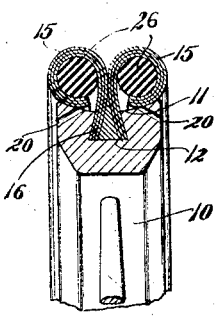
Figure 2 is a section on the line 2—2 of Figure 1.

If desired the tire sections may include compressible cores as indicated at 26 in Figures 2 and 3 of the drawings and at 27 in Figures 8 and 9.

The invention is susceptible of various changes in its form, proportions and minor details of construction and the right is herein reserved to make such changes as properly fall within the scope of the appended claims.

Having described the invention what is claimed is:—

1. The combination with a wheel having a rim provided with a circumferentially arranged transversely curved seat and a circumferential channel extending inwardly from said seat, of a tire comprising a plurality of resilient curved sections substantially circular in cross section and engaging the curved seat, anchoring means at one end of each section for removable engagement with the walls of the circumferential channel and means for holding the anchoring means in engaged position.

2. The combination with a wheel having a rim provided with a circumferentially arranged transversely curved seat and a circumferential channel extending inwardly from said seat, of a tire comprising a plurality of resilient curved sections substantially circular in cross section and engaging the curved seat, a lug extending from one end of each section for removable engagement with the walls of the circumferential channel and means carried by the rim and engaging the lug of one section for holding the sections in place.

3. The combination with a wheel having a rim provided with a circumferentially arranged transversely curved seat, of a tire comprising a plurality of resilient curved sections substantially circular in cross section and engaging the curved seat, each of said sections including a plurality of laminated plates and means for securing the sections to the rim whereby one end of each section will be held stationary with respect to the rim and the other end permitted transverse sliding movement.

4. The combination with a wheel having a rim provided with a circumferentially arranged transversely curved seat and a circumferential channel extending inwardly from said seat, of a tire comprising a plurality of resilient transversely curved sections substantially circular in cross section and engaging the curved seat, each of said sections including a plurality of thin metallic plates arranged one upon the other, linings between the plates and means for securing the sections to the rim, whereby one end of each section will be held stationary with respect to the rim and the other end permitted transverse sliding movement.

5. The combination with a member having a circumferentially arranged transversely curved seat and a circumferential channel extending inwardly from said seat, of a plurality of resilient transversely curved sections substantially circular in cross section and engaging the curved seat and means for securing the sections in position, whereby one end of each section will be held stationary with respect to the member and the other end permitted transverse sliding movement.

6. The combination with a wheel having a rim provided with a circumferentially arranged transversely curved seat, of a tire comprising a plurality of resilient transverse sections substantially circular in cross section and engaging the curved seat, resilient cores within the circular sections and means for securing the sections to the rim whereby one end of each section will be held stationary with respect to the rim and the other end permitted transverse sliding movement.

7. A cushioning device comprising a member having a bearing face and a channel extending inwardly from said face, of cushioning means comprising a plurality of resilient sections substantially circular in cross section and engaging the bearing face and anchoring means at one end of each section for engagement with the walls of the channel.

In testimony whereof I have affixed my signature.

ALBERTO NORIEGA.